US012761929B2

(12) United States Patent
Ruiz et al.

(10) Patent No.: US 12,761,929 B2
(45) Date of Patent: Oct. 13, 2026

(54) KERNEL PRESENTATION OF CAMERA IMAGERY DURING THE KERNEL BOOT PROCESS

(71) Applicant: Red Hat, Inc., Raleigh, NC (US)

(72) Inventors: Alberto Carlos Ruiz, Madrid (ES); Francisco Javier Martinez Canillas, Madrid (ES)

(73) Assignee: Red Hat, LLC, Raleigh, NC (US)

( * ) Notice: Subject to any disclaimer, the term of this patent is extended or adjusted under 35 U.S.C. 154(b) by 70 days.

(21) Appl. No.: 18/488,157

(22) Filed: Oct. 17, 2023

(65) Prior Publication Data

US 2025/0123852 A1 Apr. 17, 2025

(51) Int. Cl.
*G06F 9/4401* (2018.01)

(52) U.S. Cl.
CPC .................................. *G06F 9/4416* (2013.01)

(58) Field of Classification Search
None
See application file for complete search history.

(56) References Cited

U.S. PATENT DOCUMENTS 9,900,448 B2 2/2018 Wang et al.
10,604,072 B2 3/2020 Honghalli Devaraju
2006/0050155 A1 3/2006 Ing et al.
2012/0075465 A1* 3/2012 Wengrovitz ........... H04N 7/181 348/143
2019/0050273 A1* 2/2019 Tamir .................... G06F 9/4411
2022/0337682 A1* 10/2022 Waskiewicz, Jr. ...... H04L 41/24
2023/0198964 A1* 6/2023 Viswambharan ... H04L 63/0485 713/168

OTHER PUBLICATIONS

Vieira, Marcos A. M., et al., "Fast Packet Processing with eBPF and XDP: Concepts, Code, Challenges and Applications," ACM Comput. Surv., vol. X, No. X, Article X, Jun. 2019, 35 pages.
Extended European Search Report for European Patent Application No. 24205694.3, dated Feb. 18, 2025, 9 pages.
Examination Report for EP Patent Application No. 24205694.3, dated Dec. 1, 2025, 5 pages.
Examination Report for EP Patent Application No. 24205694.3, dated Jun. 25, 2026, 8 pages.

* cited by examiner

*Primary Examiner* — Fahmida Rahman
(74) *Attorney, Agent, or Firm* — Dority & Manning, P.A.

(57) ABSTRACT

A kernel of an operating system executing on a computing device is notified that the kernel is to provide network packets received by the kernel via a network interface to an eBPF program executing in an eBPF environment of the kernel. The eBPF program receives, from the kernel, a camera network packet originating from a camera. The eBPF program causes information derived from the camera network packet to be copied to an image buffer of a display device driver for presentation on a display device.

17 Claims, 6 Drawing Sheets

KERNEL PRESENTATION OF CAMERA IMAGERY DURING THE KERNEL BOOT PROCESS

BACKGROUND

It is desirable, and may be required pursuant to regulation, that imagery generated by a rear-view camera of a vehicle be presented on a display screen inside the vehicle within seconds, such as within two seconds, of putting the vehicle in reverse.

SUMMARY

The examples disclosed herein implement kernel presentation of camera imagery during a kernel boot process of a kernel-based operating system (OS), such as, by way of non-limiting example, a Linux OS.

In one example a method is provided. The method includes notifying a kernel of an operating system executing on a computing device that the kernel is to provide network packets received by the kernel via a network interface to an extended Berkeley Packet Filter (eBPF) program executing in an eBPF environment of the kernel. The method further includes receiving, by the eBPF program from the kernel, a camera network packet originating from a camera. The method further includes causing, by the eBPF program, information derived from the camera network packet to be copied to an image buffer of a display device driver for presentation on a display device.

In another example a computing device is provided. The computing device includes a random access memory, a network interface operable to interface with a camera, and a processor device coupled to the random access memory and the network interface to notify a kernel of an operating system executing on the computing device that the kernel is to provide network packets received by the kernel via the network interface to an extended Berkeley Packet Filter (eBPF) program executing in an eBPF environment of the kernel. The processor device is further to receive, by the eBPF program from the kernel, a camera network packet originating from the camera. The processor device is further to cause, by the eBPF program, information derived from the camera network packet to be copied to an image buffer of a display device driver for presentation on a display device.

In another example a non-transitory computer-readable storage medium is provided. The non-transitory computer-readable storage medium includes executable instructions to cause a processor device to notify a kernel of an operating system executing on a computing device that the kernel is to provide network packets received by the kernel via a network interface to an extended Berkeley Packet Filter (eBPF) program executing in an eBPF environment of the kernel. The instructions are further to cause the processor device to receive, by the eBPF program from the kernel, a camera network packet originating from a camera. The instructions are further to cause the processor device to cause, by the eBPF program, information derived from the camera network packet to be copied to an image buffer of a display device driver for presentation on a display device.

Individuals will appreciate the scope of the disclosure and realize additional aspects thereof after reading the following detailed description of the examples in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

DETAILED DESCRIPTION

Figure 1:
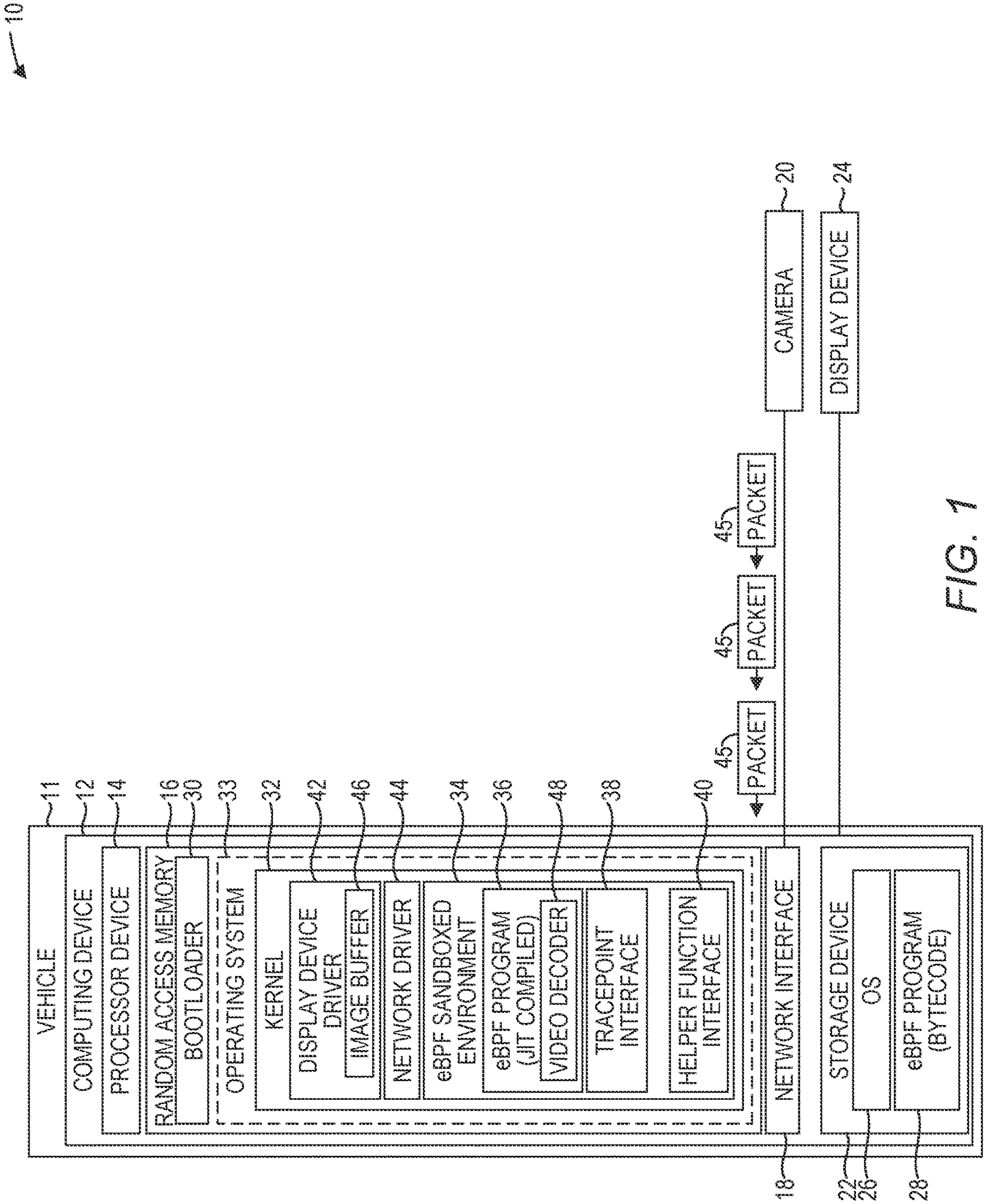
FIG. 1 is a block diagram of an environment in which kernel presentation of camera imagery during the kernel boot process can be practiced according to some implementations.

The examples set forth below represent the information to enable individuals to practice the examples and illustrate the best mode of practicing the examples. Upon reading the following description in light of the accompanying drawing figures, individuals will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the examples are not limited to any particular sequence of steps. The use herein of ordinals in conjunction with an element is solely for distinguishing what might otherwise be similar or identical labels, such as "first message" and "second message," and does not imply an initial occurrence, a quantity, a priority, a type, an importance, or other attribute, unless otherwise stated herein. The term "about" used herein in conjunction with a numeric value means any value that is within a range of ten percent greater than or ten percent less than the numeric value. As used herein and in the claims, the articles "a" and "an" in reference to an element refers to "one or more" of the element unless otherwise explicitly specified. The word "or" as used herein and in the claims is inclusive unless contextually impossible. As an example, the recitation of A or B means A, or B, or both A and B. The word "data" may be used herein in the singular or plural depending on the context. The use of "and/or" between a phrase A and a phrase B, such as "A and/or B" means A alone, B alone, or A and B together.

It is desirable, and may be required pursuant to regulation, that imagery generated by a rear-view camera of a vehicle be presented on a display screen inside the vehicle within seconds, such as within two seconds, of putting the vehicle in reverse. For a proprietary operating system of a vehicle manufacturer, this may not be overly burdensome or complicated because the vehicle manufacturer may simply modify the operating system to meet the requirement. Increasingly, however, vehicle manufacturers are attempting to utilize existing robust operating systems, such as, by way non-limiting example, the Linux operating system, for core vehicle functions rather than maintaining a proprietary operating system.

Unfortunately, many operating systems (OSs) may take several seconds or longer to complete a boot process of the OS prior to being able to execute applications in user space, and thus a user-space program that is capable of providing imagery generated by a rear-view camera on a display device may not be operable in sufficient time to meet the requirement.

If the OS is owned or controlled by an entity or committee, changing the OS may be very time-consuming, impractical or even impossible because any change to the OS must be carefully tested to ensure the change does not negatively impact any other functionality of the OS. Moreover, certain operating systems may require that any changes meet certain criteria and be accepted by various entities. Moreover, a mature operating system may include tens of millions of lines of software instructions, and revising the OS to implement new functionality may require relatively expensive and rare skills.

It may be possible to implement certain functionality in a kernel module. However, writing a kernel module requires costly and relatively rare skills, and if a kernel module fails, the entire OS and computing device may be brought down by the failure. Moreover, from a security standpoint, a kernel module executes as privileged code and thus has access to everything on the computing device, including data and executable code. Thus, a kernel module can present a significant security risk. Accordingly, many users are hesitant to implement kernel modules.

The examples disclosed herein implement kernel presentation of camera imagery during a kernel boot process of a kernel-based operating system, such as, by way of non-limiting example, a Linux OS. The examples utilize an eBPF (extended Berkeley Packet Filter) program that can be loaded by the kernel during the boot process. The kernel is instructed to provide the eBPF program with network packets received by the kernel via a network interface. The eBPF program receives a camera network packet originating from a camera, and causes information derived from the camera network packet to be written to an image buffer of a display device driver for presentation on a display device.

The examples disclosed herein implement a sandboxed eBPF program that executes in the kernel early in the boot process without a need to initiate a kernel loadable module. The eBPF program can immediately begin processing camera network packets for sending to a display driver for presentation on a display device in the vehicle even before the kernel has completed the boot process, such as prior to mounting a file system and prior to initiating user space applications, and thus facilitates the presentation of rear-view camera imagery within two seconds of the vehicle being placed into reverse.

FIG. 1 is a block diagram of an environment 10 in which kernel presentation of camera imagery during the kernel boot process can be practiced according to some implementations. The environment 10 includes a vehicle 11, a computing device 12, which in turn includes a processor device 14, a random access memory 16 (hereinafter "memory 16" for the sake of brevity), and a network interface 18 operable to communicate with a camera 20. The computing device 12 includes or is communicatively coupled to a storage device 22 and to a display device 24. The computing device 12, in this example, controls at least certain functions of the vehicle 11, such as providing rear view imagery on the display device 24. The camera 20 may be a rear facing camera, and the display device 24 is positioned to be viewable by a driver of the vehicle 11.

The storage device 22 includes a kernel-based operating system 26, such as, by way of non-limiting example, the Linux operating system. However, the examples disclosed herein are not limited to Linux and have applicability to any OS that includes a kernel that resides between hardware of the computing device 12 and a user space where user applications execute and invoke kernel functions of the kernel in order to access hardware, such as the storage device 22, the camera 20, the display device 24, and the like, and that support eBPF, such as, by way of non-limiting example, Microsoft® Windows® and FreeBSD.

The storage device 22 also includes an eBPF program 28 that, as will be described in greater detail herein, is operable to receive network packets generated by the camera 20 and provide information derived from the network packets to the display device 24 for presentation to a user of the vehicle. The term eBPF refers to the extended Berkeley Packet Filter technology available at ebpf.io that implements sandboxed programs in a privileged context that execute in a kernel of a kernel-based OS. eBPF includes an in-kernel verifier that performs static code analysis to ensure that an eBPF program will not crash or otherwise interface negatively with the kernel, such as by ensuring that loops have exit conditions, a valid register state and the like. If the eBPF program passes the verification check, the eBPF program is typically just-in-time (JIT) compiled for native execution performance.

When the driver of the vehicle 11 initiates a sequence to start the vehicle 11, such as by turning a key, pressing a button, or the like, the computing device 12 initiates, automatically loads a bootloader 30 into the memory 16 and initiates the bootloader 30. The bootloader 30 loads at least a portion of a kernel 32 of the OS 26 at a first memory location of the memory 16, and loads the eBPF program 28 at a second memory location of the memory 16. The bootloader 30 causes the kernel 32 to be initiated as part of an executing OS 33 from the first memory location and, in conjunction with the initiation, provides, to the kernel 32, information that indicates that the eBPF program 28 is located at the second memory location.

The kernel 32 initiates and, as part of the initiation, initiates an eBPF sandboxed environment 34. The eBPF program 28 is bytecode, and the eBPF sandboxed environment 34 first validates, as discussed above via static code analysis, the eBPF program 28 to ensure that the eBPF program 28 has been written to comply with certain rules to eliminate or reduce a likelihood that the eBPF program 28 can cause a failure of the kernel 32. Once validated, the eBPF sandboxed environment 34 compiles the eBPF program 28 to a native instruction set of the processor device 14, and initiates the eBPF program 28 as an eBPF program 36. The eBPF program 36 is attached to a kernel network packet hook, sometimes referred to as a kernel network packet tracepoint, of the kernel 32 via a tracepoint interface 38. Once attached to the kernel network packet tracepoint, the kernel 32 provides, to the eBPF program 36, network packets that are received by the network interface 18. The eBPF program 28 may be attached to the kernel network packet tracepoint, for example, by invoking a particular function that causes the eBPF program 28 to be attached to the kernel network packet tracepoint.

As part of the kernel boot process, the kernel 32 initiates a display device driver 42 that is operable to present information that is contained in an image buffer 46 to the display device 24. The kernel 32 may expose access to the display device driver 42 to the eBPF program 36 via a helper function interface 40. The kernel 32 also initiates a network driver 44 that is operable to receive and transmit packets via the network interface 18 to which the camera 20 is connected.

In conjunction with the computing device 12 initiating, the camera 20 and the display device 24 are also powered on. The camera 20 automatically begins to generate camera network packets 45 and provides the camera network packets 45 to the network interface 18. The network driver 44 receives the camera network packets 45, and because the eBPF program 36 attached to the kernel network packet tracepoint of the kernel 32 via the tracepoint interface 38, the kernel 32 causes the camera network packets 45 to be provided to the eBPF program 36.

In some implementations, all network packets received by the network interface 18 may be provided to the eBPF program 36. The eBPF program 36 may analyze a camera network packet 45 and determine, based on the contents of the camera network packet 45, that the camera network packet 45 originated from the camera 20. For example, the eBPF program 36 may determine that the camera network packet 45 contains video imagery and thus originated from the camera 20. Alternatively, the eBPF program 36 may determine an address associated with the camera 20 and determine that the camera network packet 45 has a source address of the camera 20. The eBPF program 36 may also receive network packets that do not originate from the camera 20. The eBPF program 36 may determine, based on contents of a network packet, that the network packet did not originate from the camera 20 and, in response, discard the network packet.

In response to determining that the camera network packet 45 originated from the camera 20, the eBPF program 36 causes information derived from the camera network packet 45 to be copied to the image buffer 46 of the display device driver 42 for presentation on the display device 24. In one implementation, the eBPF program 36 invokes a kernel helper function that is implemented via the helper function interface 40. When invoked, the kernel 32 causes information generated by the eBPF program 36 to be copied to the image buffer 46. When the image buffer 46 is full, the display device driver 42 presents the image buffer 46 on the display device 24. The image buffer 46 may be refilled with new video data at any desired frame rate, such as 30 or 60 frames per second.

In some implementations, the eBPF program 36 may include a video decoder 48 that is operable to decode the camera network packet 45 from a particular encoded format, such as H.264 or the like, to generate decoded camera network packets. The decoded camera network packets may be the information derived from the camera network packets 45 that is copied to the image buffer 46. In other implementations, to decode the camera network packet 45, the eBPF program 36 may invoke a helper function via the helper function interface 40 that decodes the camera network packet 45.

Subsequently, after the boot process, the kernel 32 may initiate a display device control program that is operable to implement a user interface on the display device 24. The display device control program may take over presentation of the camera network packets 45 utilizing conventional user space display presentation techniques. Alternatively, a trigger condition may cause the transfer of control from the eBPF program 36 to the display device control program, such as shifting the vehicle from reverse to drive.

Figure 2:
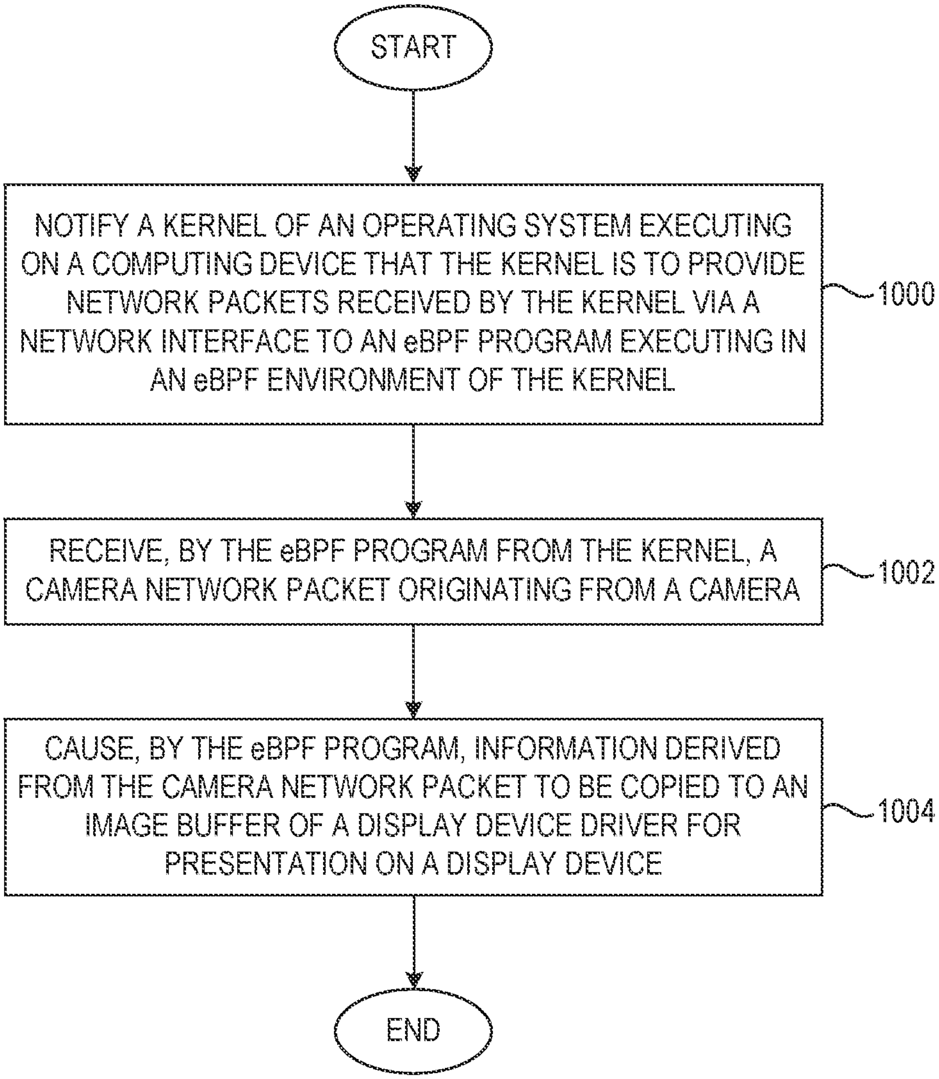
FIG. 2 is a flowchart of a method for kernel presentation of camera imagery during the kernel boot process according to some implementations.

FIG. 2 is a flowchart of a method for kernel presentation of camera imagery during the kernel boot process according to some environments. FIG. 2 will be discussed in conjunction with FIG. 1. The kernel 32 of the OS 33 executing on the computing device 12 is notified that the kernel 32 is to provide network packets received by the kernel 32 via the network interface 18 to the eBPF program 36 executing in the eBPF sandboxed environment 34 of the kernel 32 (FIG. 2, block 1000). The eBPF program 36 receives, from the kernel 32, a camera network packet 45 originating from the camera 20 (FIG. 2, block 1002). The eBPF program 36 causes information derived from the camera network packet 45 to be copied to the image buffer 46 of the display device driver 42 for presentation on the display device 24 (FIG. 2, block 1004).

Figure 3A:
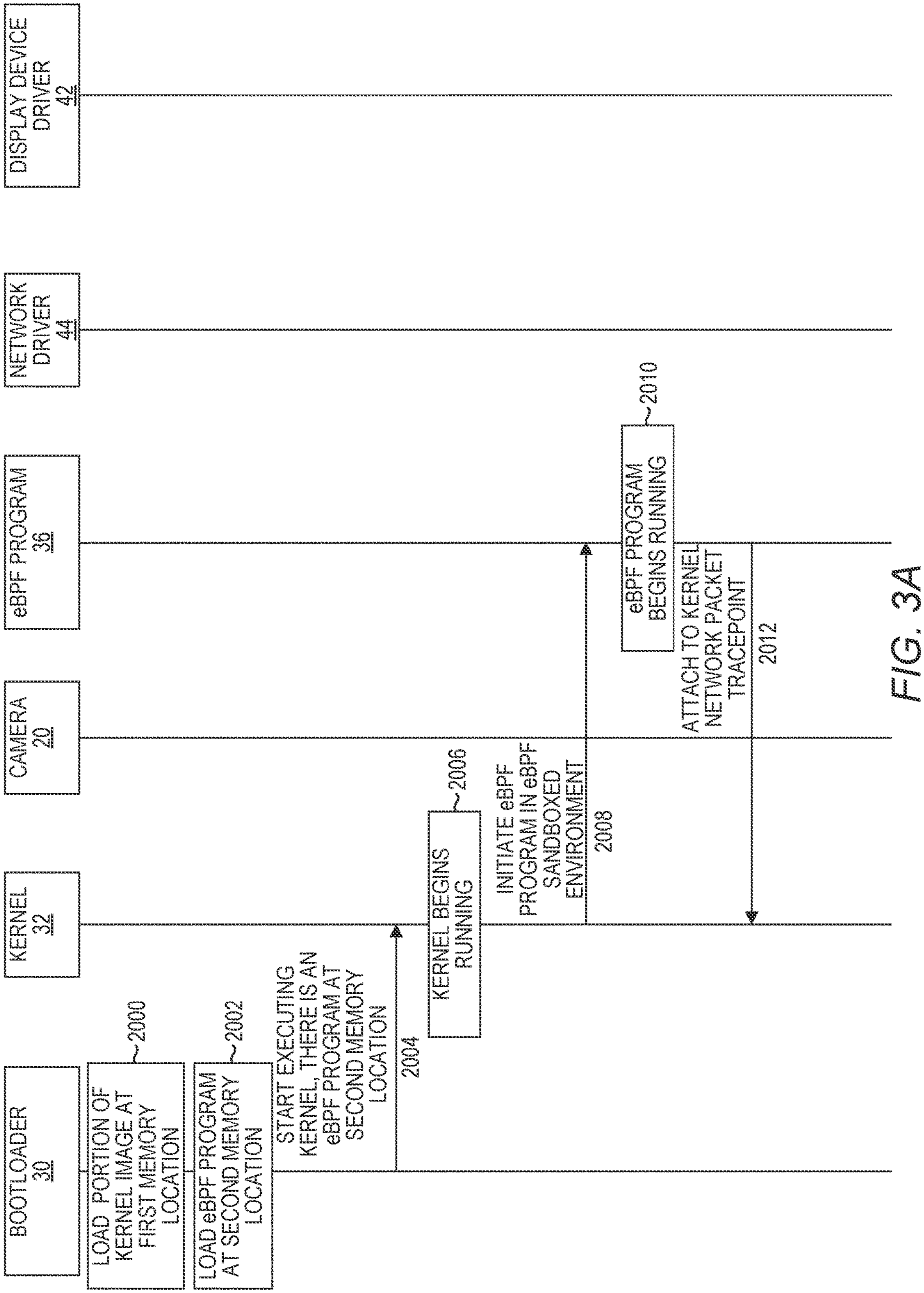
FIGS. 3A-3B illustrate a sequence diagram illustrating messages between and actions taken by certain components illustrated in FIG. 1 during a process of kernel presentation of camera imagery during the kernel boot process according to some implementations.
Figure 3B:
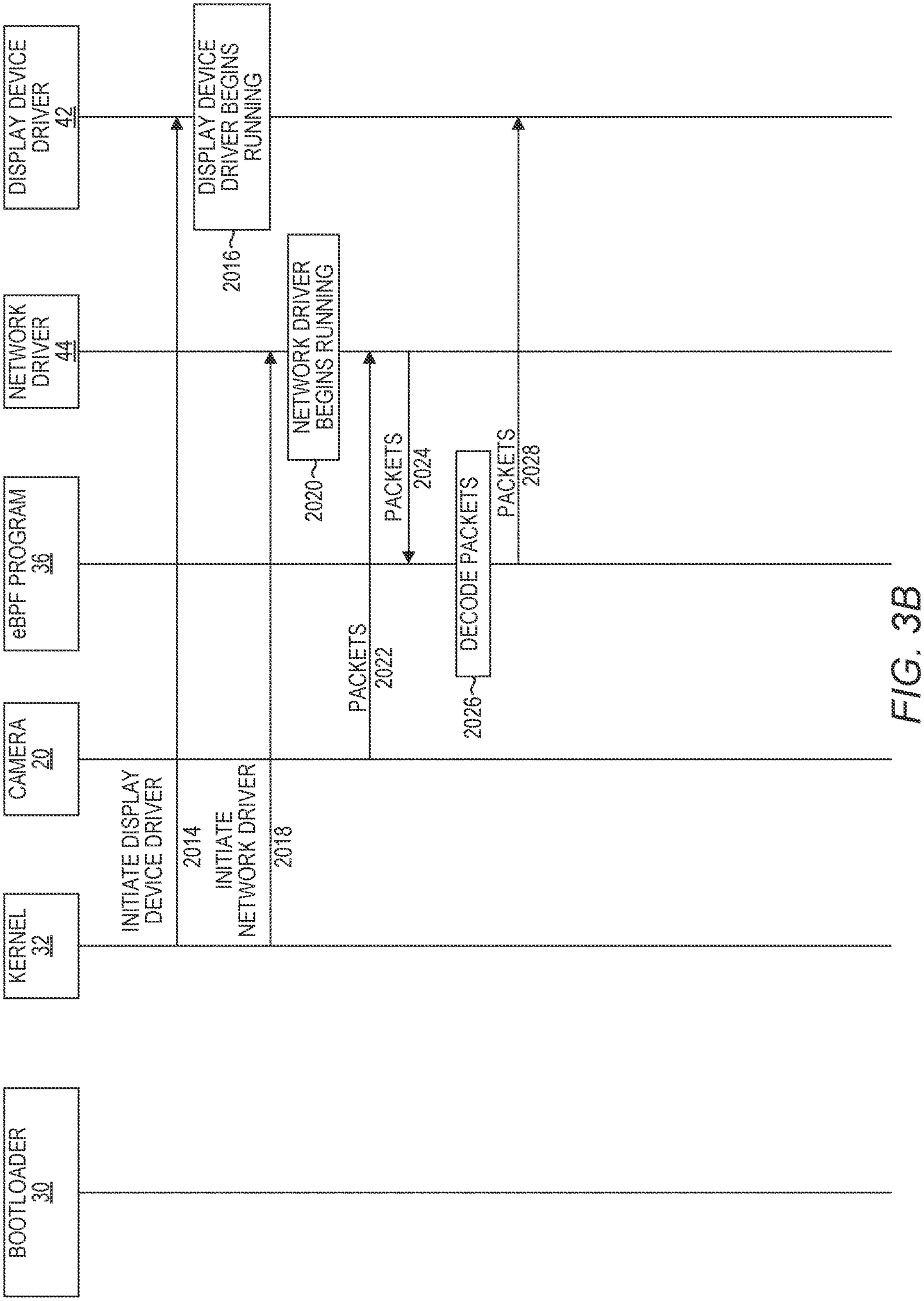

FIGS. 3A-3B illustrate a sequence diagram illustrating messages between and actions taken by certain components illustrated in FIG. 1 during a process of kernel presentation of camera imagery during the kernel boot process according to some implementations. Upon some condition, the computing device 12 initiates and, as part of the initiation process, executes the bootloader 30. The bootloader 30 loads a portion of the kernel 32 into a location of the memory 16 (FIG. 3A, step 2000). The bootloader 30 loads the eBPF program 36 into another location of the memory 16 (FIG. 3A, step 2002). The bootloader 30 causes the kernel 32 to begin initiating and informs the kernel 32 of the location of the eBPF program 36 (FIG. 3A, step 2004). In an alternative implementation, the kernel 32 may automatically look for the eBPF program 36 at some predetermined location to determine if the eBPF program 36 exists. The kernel 32 begins running, and initiates the eBPF program 36 in the eBPF sandboxed environment 34 (FIG. 3A, steps 2006, 2008).

The eBPF program 36 begins running (FIG. 3A, step 2010). The eBPF program 36 invokes a tracepoint via the tracepoint interface 38 that causes an attachment of the eBPF program 36 to a particular event that causes any packets received by the network driver 44 to be provided to the eBPF program 36 (FIG. 3A, step 2012). Referring now to FIG. 3B, the kernel 32 initiates the display device driver 42 (FIG. 3B, step 2014). The display device driver 42 begins running (FIG. 3B, step 2016). The kernel 32 initiates the network driver 44 (FIG. 3B, step 2018). The network driver 44 begins running (FIG. 3B, step 2020).

The camera 20 begins generating camera network packets 45 and sending the camera network packets 45 to the network driver 44 (FIG. 3B, step 2022). The camera network packets 45 are provided to the eBPF program 36 (FIG. 3B, step 2024). The eBPF program 36 decodes the network packets and, using a helper function via the helper function interface 40, causes the decoded network packets to be copied to the image buffer 46 (FIG. 3B, steps 2026, 2028). The display device driver 42 presents the image buffer 46 on the display device 24.

Figure 4:
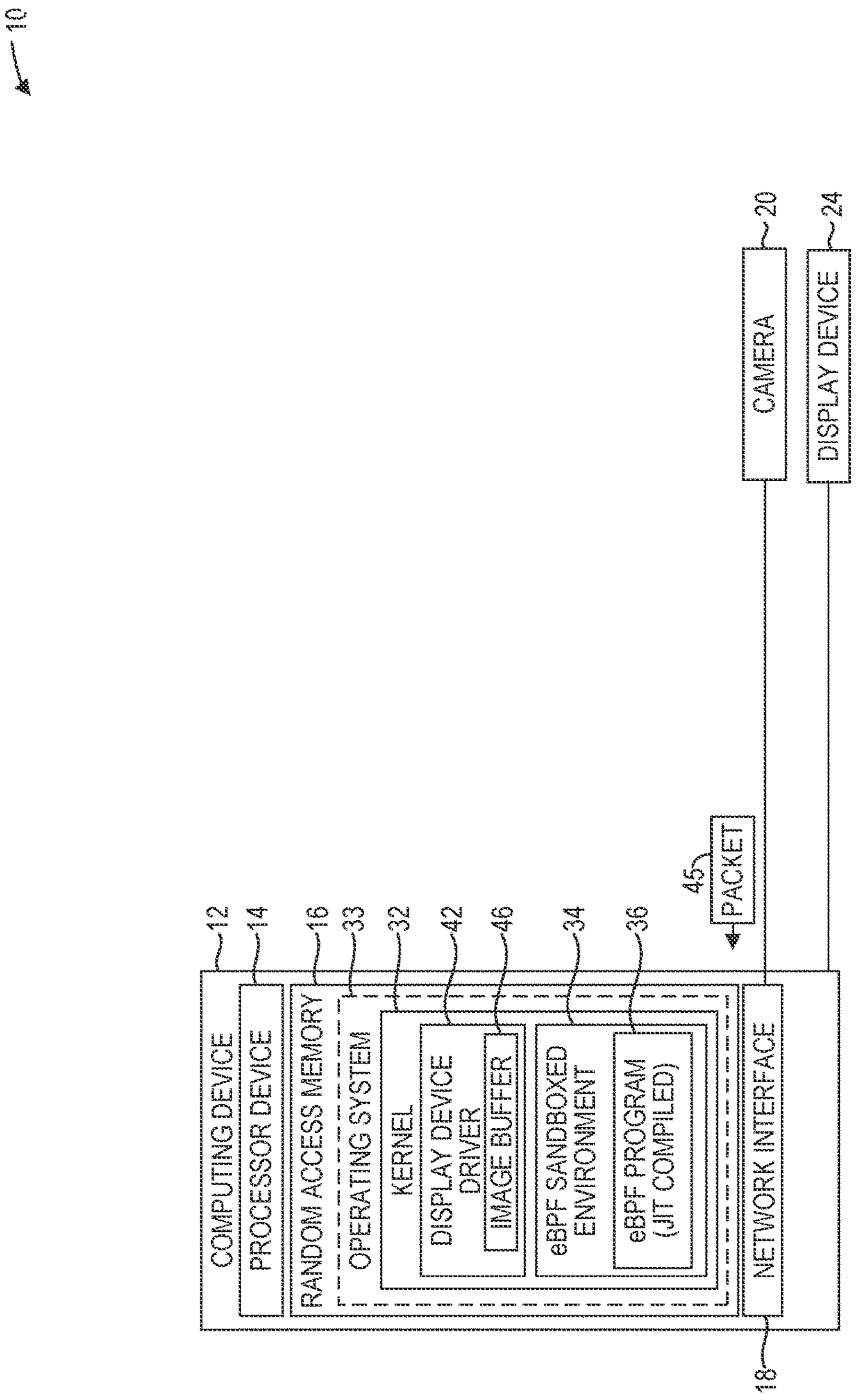
FIG. 4 is a simplified block diagram of the environment illustrated in FIG. 1 according to one implementation.

FIG. 4 is a simplified block diagram of the environment illustrated in FIG. 1 according to one implementation. The environment 10 includes the computing device 12, the random access memory 16, the processor device 14, and the network interface 18 operable to interface with the camera 20. The processor device 14 is coupled to the random access memory 16 and the network interface 18 and is to notify the kernel 32 of the operating system 33 executing on the computing device 12 that the kernel 32 is to provide network packets received by the kernel 32 via the network interface 18 to the eBPF program 36 executing in the eBPF environment 34 of the kernel 32. The processor device 14 is further to receive, by the eBPF program 36 from the kernel 32, a camera network packet 45 originating from the camera 20. The processor device 14 is further to cause, by the eBPF program 36, information derived from the camera network packet 45 to be copied to the image buffer 46 of the display device driver 42 for presentation on the display device 24.

Figure 5:
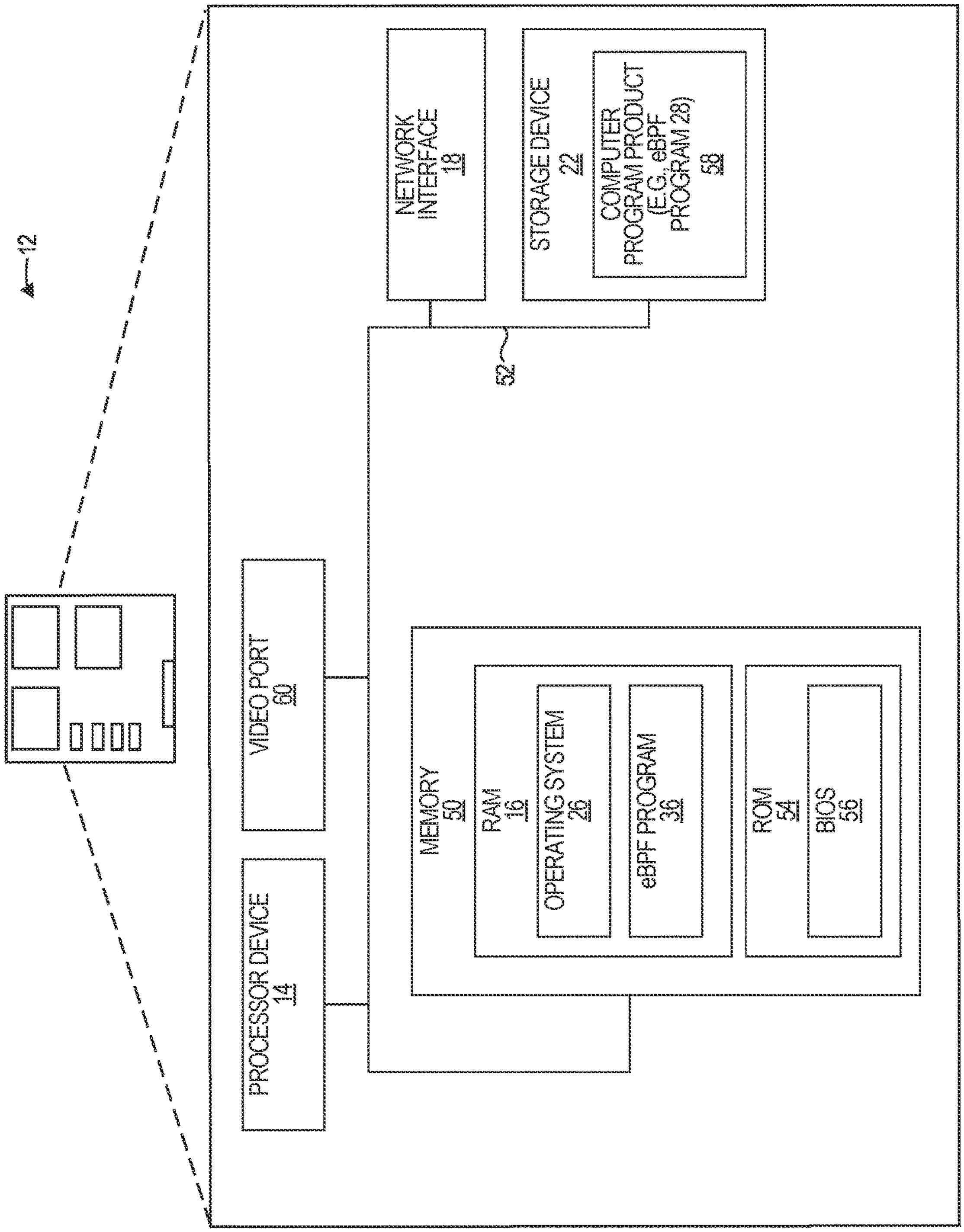
FIG. 5 is a block diagram of a computing device suitable for implementing examples according to one example.

FIG. 5 is a block diagram of the computing device 12 suitable for implementing examples according to one example. The computing device 12 may comprise any computing or electronic device capable of being located in a vehicle including firmware, hardware, and/or executing software instructions to implement the functionality described herein, such as a complete motherboard and peripherals disclosed herein. The computing device 12 includes the processor device 14, a system memory 50, and a system bus 52. The system bus 52 provides an interface for system components including, but not limited to, the system memory 50 and the processor device 14. The processor device 14 can be any commercially available or proprietary processor device.

The system bus 52 may be any of several types of bus structures that may further interconnect to a memory bus (with or without a memory controller), a peripheral bus, and/or a local bus using any of a variety of commercially available bus architectures. The system memory 50 may include non-volatile memory 54 (e.g., read-only memory (ROM), erasable programmable read-only memory (EPROM), electrically erasable programmable read-only memory (EEPROM), etc.), and the volatile memory 16 (e.g., random-access memory (RAM)). A basic input/output system (BIOS) 56 may be stored in the non-volatile memory 54 and can include the basic routines that help to transfer information between elements within the computing device 12. The volatile memory 16 may also include a high-speed RAM, such as static RAM, for caching data.

The computing device 12 may further include or be coupled to a non-transitory computer-readable storage medium such as the storage device 22, which may comprise, for example, an internal hard disk drive (HDD) (e.g., enhanced integrated drive electronics (EIDE) or serial advanced technology attachment (SATA)), HDD (e.g., EIDE or SATA) for storage, flash memory, or the like. The storage device 22 and other drives associated with computer-readable media and computer-usable media may provide non-volatile storage of data, data structures, computer-executable instructions, and the like.

A number of modules can be stored in the storage device 22 and in the volatile memory 16, including the operating system and one or more program modules, such as the eBPF program 36, which may implement the functionality described herein in whole or in part. All or a portion of the examples may be implemented as a computer program product 58 stored on a transitory or non-transitory computer-usable or computer-readable storage medium, such as the storage device 22, which includes complex programming instructions, such as complex computer-readable program code, to cause the processor device 14 to carry out the steps described herein. Thus, the computer-readable program code can comprise software instructions for implementing the functionality of the examples described herein when executed on the processor device 14.

The computing device 12 includes the network interface 18 suitable for communicating with the camera 20. The computing device 12 may also include a video port 60 configured to interface with the display device 24, for presentation of rear-view imagery to the driver of the vehicle 11.

Individuals will recognize improvements and modifications to the preferred examples of the disclosure. All such improvements and modifications are considered within the scope of the concepts disclosed herein and the claims that follow.

What is claimed is:

1. A method, comprising:

notifying a kernel of an operating system executing on a computing device that the kernel is to provide network packets received by the kernel via a network interface to an extended Berkeley Packet Filter (eBPF) program executing in an eBPF environment of the kernel;

receiving, by the eBPF program from the kernel at a first instance in time, a camera network packet originating from a camera;

analyzing, by the eBPF program, the camera network packet;

determining, based on contents of the camera network packet, that the camera network packet originated from the camera; and in response to determining that the camera network packet originated from the camera, causing, by the eBPF program, information derived from the camera network packet to be copied to an image buffer of a display device driver for presentation on a display device.

2. The method of claim 1, further comprising:

loading, by a bootloader, at least a portion of the kernel at a first memory location in a random access memory of the computing device;

loading, by the bootloader, a bytecode version of the eBPF program at a second memory location; and causing, by the bootloader, the kernel to be initiated from the first memory location and providing, to the kernel, information that indicates that the bytecode version of the eBPF program is located at the second memory location.

3. The method of claim 1, further comprising:

processing, by the eBPF program, the camera network packet to decode the camera network packet from an encoded format to generate a decoded camera network packet; and wherein causing, by the eBPF program, the information derived from the camera network packet to be copied to the image buffer of the display device driver for presentation on the display device comprises causing, by the eBPF program, information contained in the decoded camera network packet to be copied to the image buffer of the display device driver for presentation on the display device.

4. The method of claim 1, wherein notifying the kernel that the kernel is to provide the network packets received by the kernel via the network interface to the eBPF program comprises invoking, by the eBPF program, a function to cause the eBPF program to be attached to a kernel network packet tracepoint.

5. The method of claim 1, wherein causing, by the eBPF program, the information derived from the camera network packet to be copied to the image buffer of the display device driver for presentation on the display device comprises invoking, by the eBPF program, a kernel helper function that, when invoked, causes the information derived from the camera network packet to be copied to the image buffer of the display device driver for presentation on the display device.

6. The method of claim 1, further comprising:

receiving, by the eBPF program at a first instance in time, a network packet;

determining, based on contents of the network packet, that the network packet did not originate from the camera; and in response to determining that the network packet did not originate from the camera, discarding the network packet.

7. A computing device, comprising:

a random access memory;

a network interface operable to interface with a camera; and a processor device coupled to the random access memory and the network interface, the processor device operable to:

notify a kernel of an operating system executing on the computing device that the kernel is to provide network packets received by the kernel via the network interface to an extended Berkeley Packet Filter (eBPF) program executing in an eBPF environment of the kernel;

receive, by the eBPF program from the kernel at a first instance in time, a camera network packet originating from the camera;

analyze, by the eBPF program, the camera network packet;

determine, based on contents of the camera network packet, that the camera network packet originated from the camera; and in response to determining that the camera network packet originated from the camera, cause, by the eBPF program, information derived from the camera network packet to be copied to an image buffer of a display device driver for presentation on a display device.

8. The computing device of claim 7, wherein the processor device is further operable to:

load, by a bootloader, at least a portion of the kernel at a first memory location in the random access memory;

load, by the bootloader, a bytecode version of the eBPF program at a second memory location; and cause, by the bootloader, the kernel to be initiated from the first memory location and provide, to the kernel, information that indicates that the bytecode version of the eBPF program is located at the second memory location.

9. The computing device of claim 7, wherein the processor device is further operable to:

process, by the eBPF program, the camera network packet to decode the camera network packet from an encoded format to generate a decoded camera network packet; and wherein to cause, by the eBPF program, the information derived from the camera network packet to be copied to the image buffer of the display device driver for presentation on the display device, the processor device is further to cause, by the eBPF program, information contained in the decoded camera network packet to be copied to the image buffer of the display device driver for presentation on the display device.

10. The computing device of claim 7, wherein to notify the kernel that the kernel is to provide the network packets received by the kernel via the network interface to the eBPF program, the processor device is further operable to invoke, by the eBPF program, a function to cause the eBPF program to be attached to a kernel network packet tracepoint.

11. The computing device of claim 7, wherein the processor device is further operable to:

receive, by the eBPF program at a second instance in time, a network packet;

determine, based on contents of the network packet, that the network packet did not originate from the camera; and in response to determining that the network packet did not originate from the camera, discard the network packet.

12. The computing device of claim 7, wherein to cause, by the eBPF program, the information derived from the camera network packet to be copied to the image buffer of the display device driver for presentation on the display device, the processor device is further operable to invoke, by the eBPF program, a kernel helper function that, when invoked, causes the information derived from the camera network packet to be copied to the image buffer of the display device driver for presentation on the display device.

13. A non-transitory computer-readable storage medium that includes executable instructions to cause a processor device to:

notify a kernel of an operating system executing on a computing device that the kernel is to provide network packets received by the kernel via a network interface to an extended Berkeley Packet Filter (eBPF) program executing in an eBPF environment of the kernel;

receive, by the eBPF program from the kernel at a first instance in time, a camera network packet originating from a camera;

analyze, by the eBPF program, the camera network packet;

determine, based on contents of the camera network packet, that the camera network packet originated from the camera; and in response to determining that the camera network packet originated from the camera, cause, by the eBPF program, information derived from the camera network packet to be copied to an image buffer of a display device driver for presentation on a display device.

14. The non-transitory computer-readable storage medium of claim 13, wherein the instructions further cause the processor device to:

load, by a bootloader, at least a portion of the kernel at a first memory location in a random access memory;

load, by the bootloader, a bytecode version of the eBPF program at a second memory location; and cause, by the bootloader, the kernel to be initiated from the first memory location and provide, to the kernel, information that indicates that the bytecode version of the eBPF program is located at the second memory location.

15. The non-transitory computer-readable storage medium of claim 13, wherein the instructions further cause the processor device to:

process, by the eBPF program, the camera network packet to decode the camera network packet from an encoded format to generate a decoded camera network packet; and wherein to cause, by the eBPF program, the information derived from the camera network packet to be copied to the image buffer of the display device driver for presentation on the display device, the instructions are further to cause the processor device to cause, by the eBPF program, information contained in the decoded camera network packet to be copied to the image buffer of the display device driver for presentation on the display device.

16. The non-transitory computer-readable storage medium of claim 13, wherein to notify the kernel that the kernel is to provide the network packets received by the kernel via the network interface to the eBPF program, the instructions are further to cause the processor device to invoke, by the eBPF program, a function to cause the eBPF program to be attached to a kernel network packet tracepoint.

17. The non-transitory computer-readable storage medium of claim 13, wherein the instructions further cause the processor device to:

receive, by the eBPF program at a second instance in time, a network packet;

determine, based on contents of the network packet, that the network packet did not originate from the camera; and in response to determining that the network packet did not originate from the camera, discard the network packet.

* * * * *